US011219991B2

(12) United States Patent
Williams

(10) Patent No.: US 11,219,991 B2
(45) Date of Patent: Jan. 11, 2022

(54) BELL CUP MULTI-TOOL, STRUCTURE AND METHODOLOGIES

(71) Applicant: VOLKSWAGEN AG, Wolfsburg (DE)

(72) Inventor: Craig E. Williams, Harrison, TN (US)

(73) Assignee: Volkswagen AG

( * ) Notice: Subject to any disclaimer, the term of this patent is extended or adjusted under 35 U.S.C. 154(b) by 427 days.

(21) Appl. No.: 16/010,859

(22) Filed: Jun. 18, 2018

(65) Prior Publication Data
US 2019/0381641 A1    Dec. 19, 2019

(51) Int. Cl.
*B25B 27/02* (2006.01)
*B05B 3/10* (2006.01)
*B23P 19/02* (2006.01)

(52) U.S. Cl.
CPC ............ *B25B 27/02* (2013.01); *B05B 3/1064* (2013.01); *B23P 19/02* (2013.01); *B25B 27/023* (2013.01)

(58) Field of Classification Search
CPC ......... Y10T 29/53952; Y10T 29/53826; Y10T 29/49822; B25B 27/02; B25B 27/04; B25B 27/062; B25B 27/026; B25B 27/023; B25B 27/0035; B25B 27/064; B23P 19/02; B05B 3/1064
USPC ........................................ 29/426.5, 259, 280
See application file for complete search history.

(56) References Cited

U.S. PATENT DOCUMENTS

| | | | |
|---|---|---|---|
| 4,989,312 A * | 2/1991 | Maddalena | B25B 27/023 29/259 |
| 5,781,977 A * | 7/1998 | Servones | B25B 27/023 29/259 |
| 7,017,835 B2 | 3/2006 | Vetter et al. | |
| 7,946,298 B1 | 5/2011 | Marks | |
| 2002/0066808 A1 * | 6/2002 | Fiala | B05B 15/18 239/700 |
| 2009/0255463 A1 | 10/2009 | Seitz et al. | |
| 2017/0190034 A1 * | 7/2017 | Blackford | B25H 1/0014 |

FOREIGN PATENT DOCUMENTS

| | | | |
|---|---|---|---|
| DE | 9111602 U1 * | 9/1991 | |
| DE | 9111602 U1 * | 11/1991 | B25B 27/064 |

OTHER PUBLICATIONS

Sames Kremlin found at: https://www.sames-kremlin.com/usa/en/technologies-magnetic-cup.html (Year: 2020).*
Ransburg; RMA-560 Single/Dual Purge Robot Mounted Rotary Atomizer Direct Charge; Model: A13364; Service Manual; Dec. 2013.
Sames Kremlin; Hi-TE Technologies used with air bearing turbine; Feb. 2018.

* cited by examiner

*Primary Examiner* — Mahdi H Nejad
(74) *Attorney, Agent, or Firm* — Barnes & Thornburg LLP

(57) ABSTRACT

A bell cup multi-tool and method is provided for ergonomic straight-line force applications. The multi-tool includes a manipulator for providing the straight-line pressure to a distributor in a bell cup for installation or removal. The multi-tool also includes a base for securing the bell cup in a desired orientation.

18 Claims, 5 Drawing Sheets

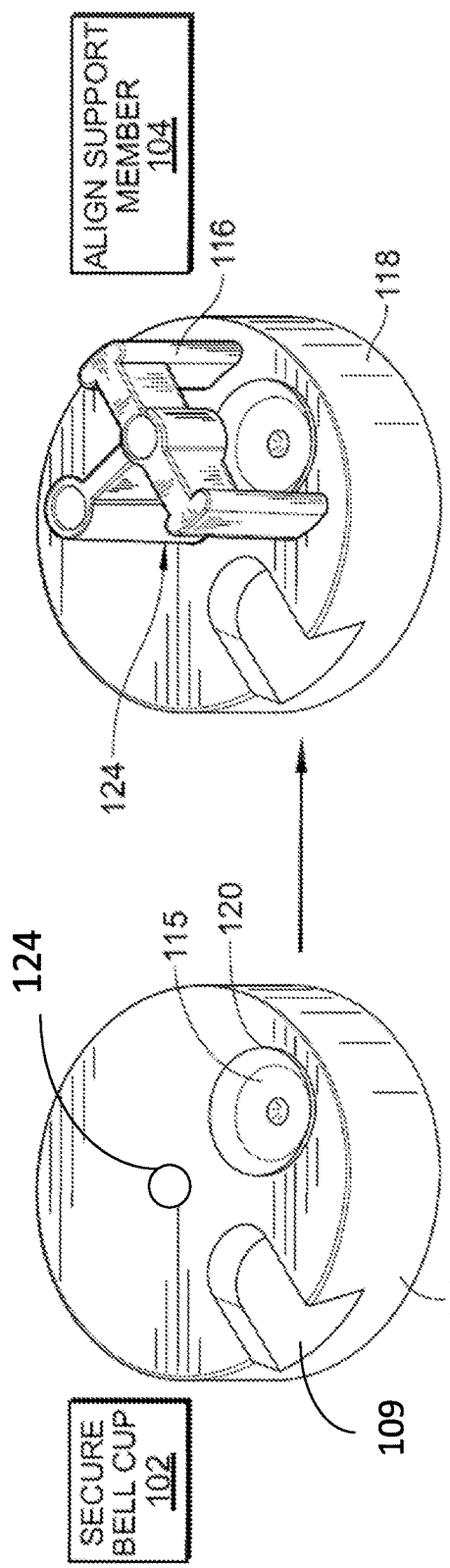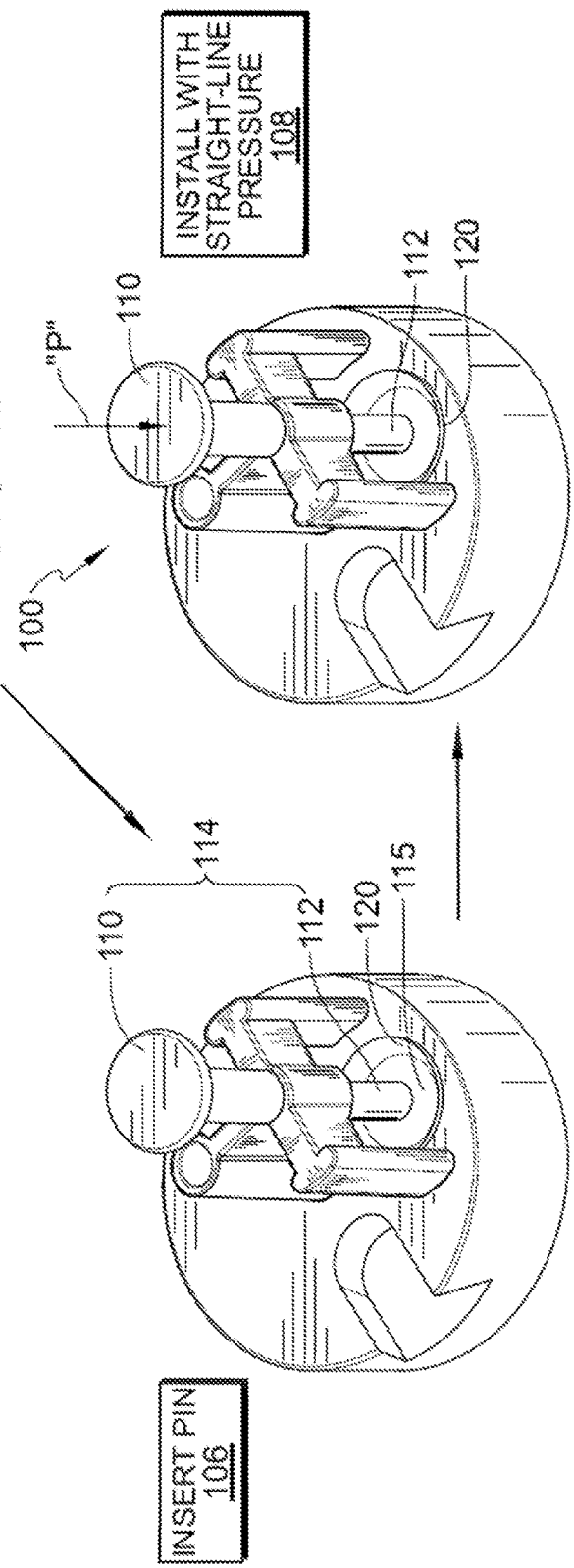

BELL CUP MULTI-TOOL, STRUCTURE AND METHODOLOGIES

BACKGROUND

The present disclosure relates to systems, components and methodologies for installing and removing distributors from bell cups. In particular, the present disclosure relates to systems, components and methodologies for using a bell cup multi-tool to ergonomically install and remove distributors from bell cups while maintaining proper straight-line pressure.

SUMMARY

According to the present disclosure, a bell cup multi-tool is provided for installing and/or removing distributors from bell cups. The multi-tool Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1A-1D constitute a diagrammatic view of an exemplary process for using a multi-tool to install a distributor in a bell cup showing a first point where the bell cup is secured, a second point where a support member is aligned relative to the bell cup, a third point where a push-pin is coupled to the support member, and a fourth point where the distributor is installed in the bell cup via a pressure applied to the push-pin.

FIG. 1A depicts a base having a blind hold sized to secure a bell cup so that the bell cup is in the upwardly facing distributor installation position with a distributor placed in the bell cup;

FIG. 1B illustrates how a support member of a manipulator tool is aligned with the bell cup so that an opening in the support member is positioned over the center point of the bell cup;

FIG. 1C depicts how the push-pin is inserted into the opening of the support member so that the push-pin is aligned with the center point of the bell cup and the distributor; and FIG. 1D shows how a downward pressure applied to a handpiece pressures the push-pin into contact with the center point of the distributor to install the distributor in the bell cup.

DETAILED DESCRIPTION

Figure 2:
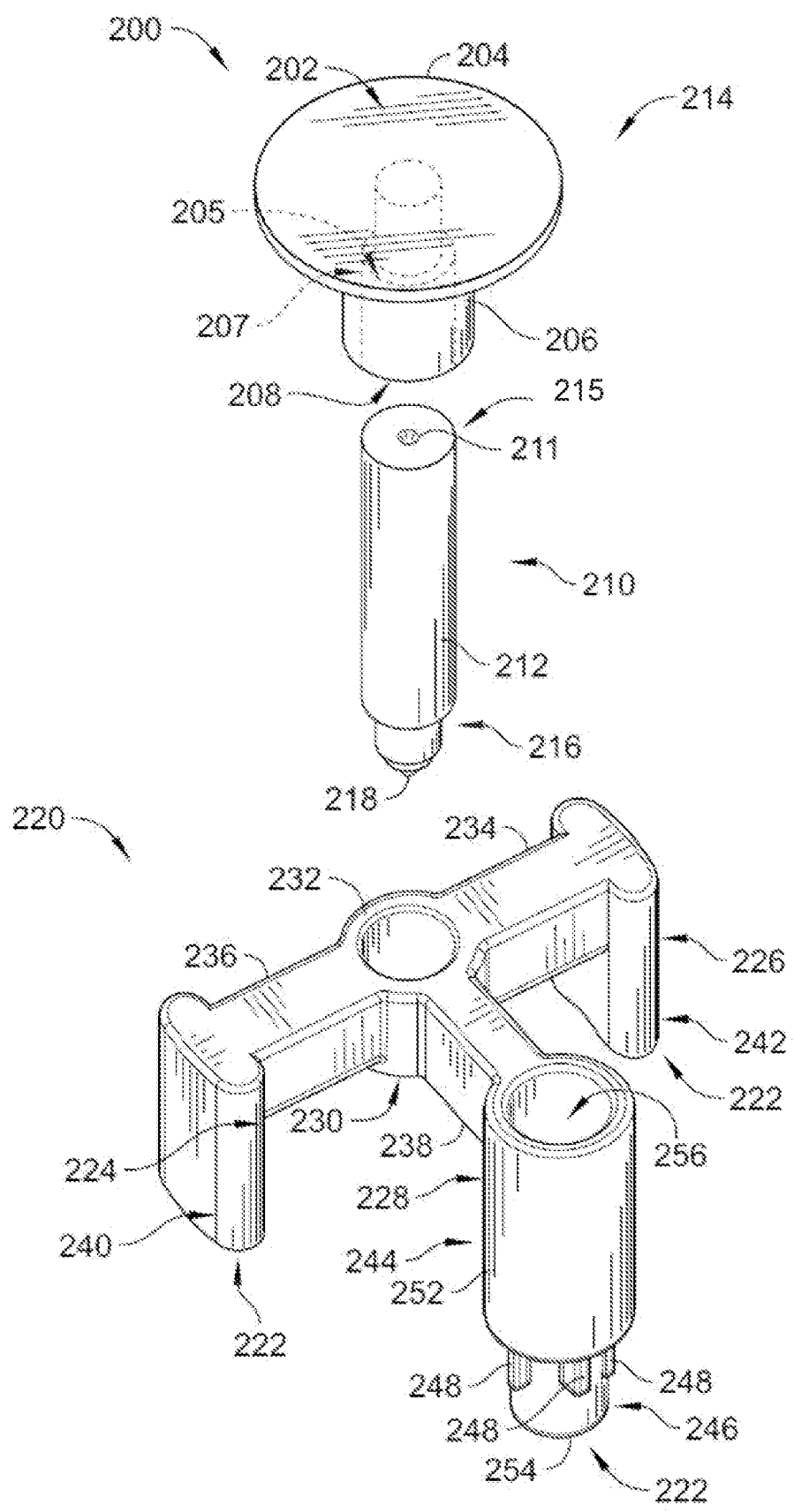
FIG. 2 is an exploded view of the manipulator including a handpiece, a push-pin, and a support member of FIGS. 1B-1D.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

FIGS. 1A-1D constitute a diagrammatic view of an exemplary distributor installation and removal system that consists of a bell cup multi-tool 100 that includes a manipulator 114 and a base 118. The system in FIGS. 1A-1D depicts how the bell cup multi-tool may be used to install a distributor in a bell cup.

In FIG. 1A, a bell cup 120 may be secured to base 118. The bell cup 120 may be inserted in a blind opening in a base 118 so that the bell cup 120 is fixed relative to the base 118 in an upwardly facing distributor installation position so that the distal rim surface of the bell cup 120 is in a plane parallel to a top surface of the base 118. A distributor 115 may be set in the bell cup 120 for installation. A support member 116 of the multi-tool may be aligned 104 by coupling the support member 116 to the base 118 via an alignment opening 124, as illustrated and further discussed in FIG. 3, in the base 118 in FIG. 1B. As seen in FIG. 1C, the pin 112 may be inserted 106 into the support member 116 so that a handpiece 110 of the manipulator 114 and the pin 112 are aligned with a central axis of the distributor 115 and the bell cup 120. This permits straight-line pressure P to be applied to the handpiece 110 so that the pin 112 pressures the distributor linearly into the bell cup to install the distributor 108. FIG. 1D depicts that the linear pressure P is translated through the manipulator 100 and perpendicular to a planar contact surface of the distributor 112 so that the distributor 115 is properly installed in a friction or interference fit in the bell cup 120, in an installation port as further illustrated and described in FIG. 3.

As illustrated in FIG. 2, the manipulator 200 of the bell-cup multi-tool includes a push-pin 214 that may have a pressure receiver 204 comprising a relatively large surface area and a hollow tubular pin receiver 206 having an opening 208 at a distal end to receive pin 210. The pressure receiver 204 is configured so that a pressure as described in FIG. 1 may be comfortably imparted on the handpiece 202 by a user's palm or a machine press. Pin 210 may have a cylindrical body 212 sized to fit in the tubular pin receiver 206 via an interference or friction fit. Pin receiver 206 may include a stepped diameter 207 as shown in phantom so that the widest cross-section of the pin 210 may only be inserted a predetermined distance to abut the step 205 and the pin 210 may extend a sufficient length through a support arm to the bell cup. Cylindrical body 212 may include a distributor installation surface 215 at one end and a distributor removal surface 216 at the other end.

As can be seen in FIG. 2. The distributor installation surface 214 may be a flat surface sized to be equal in circumference to a circumference of the cylindrical body 212 with a convex projection 211 sized to fit a concavity in a distributor surface. Distributor removal surface 216 may be flat surface that is smaller in circumference than the cylindrical body and may be formed at the end of a tapering conically shaped sidewall 218 sized to fit in a concavity in a distributor surface.

Support member 220 may include three legs 222 extending from and connected to a push-pin guide opening 230, which includes a push-pin stop surface 232 sized to block movement of cylindrical body 212 through the opening 230 and permit the pin 210 to extend through the opening 230. Legs 222 may include an alignment leg 228 and two support legs 224, 226 spaced apart from the alignment leg 228 and located on opposite sides of the push-pin guide opening 230. Legs 222 may be L-shaped and each include upper segments 234, 236, 238, extending radially from and connected to the push-pin guide opening 230. Upper segments 234, 236, 238, may be connected to extensions 240, 242, 244 that extend parallel to each other and perpendicular to the upper segments. Upper segments 234, 236, 238 may be equal in length. Alternatively, upper segment 238 of the alignment arm 228 may be shorter or longer depending on the geometry of a base to be aligned with.

Extension 244 of alignment leg may further include a proximal segment 252 extending from the upper segment 238. Coupled to an opposite end of the proximal segment 252 is distal segment 246 which may be keyed to include a plurality of detents 248 extending from the exterior of a portion 254 of the distal segment 246. As can be seen in the FIG., distal segment 246 may have a portion 254 with smaller cross-sectional area than proximal segment 250. Proximal segment 252 may be the same length as extensions 240, 242 so that bottom surfaces of each of proximal segment 252, and extensions 240, 242 may contact an upper surface of the base. Proximal segment 252 may be hollow to define a storage opening 256 sized to receive the pin body 212 and store the push-pin 214 when not in use.

Figure 3:
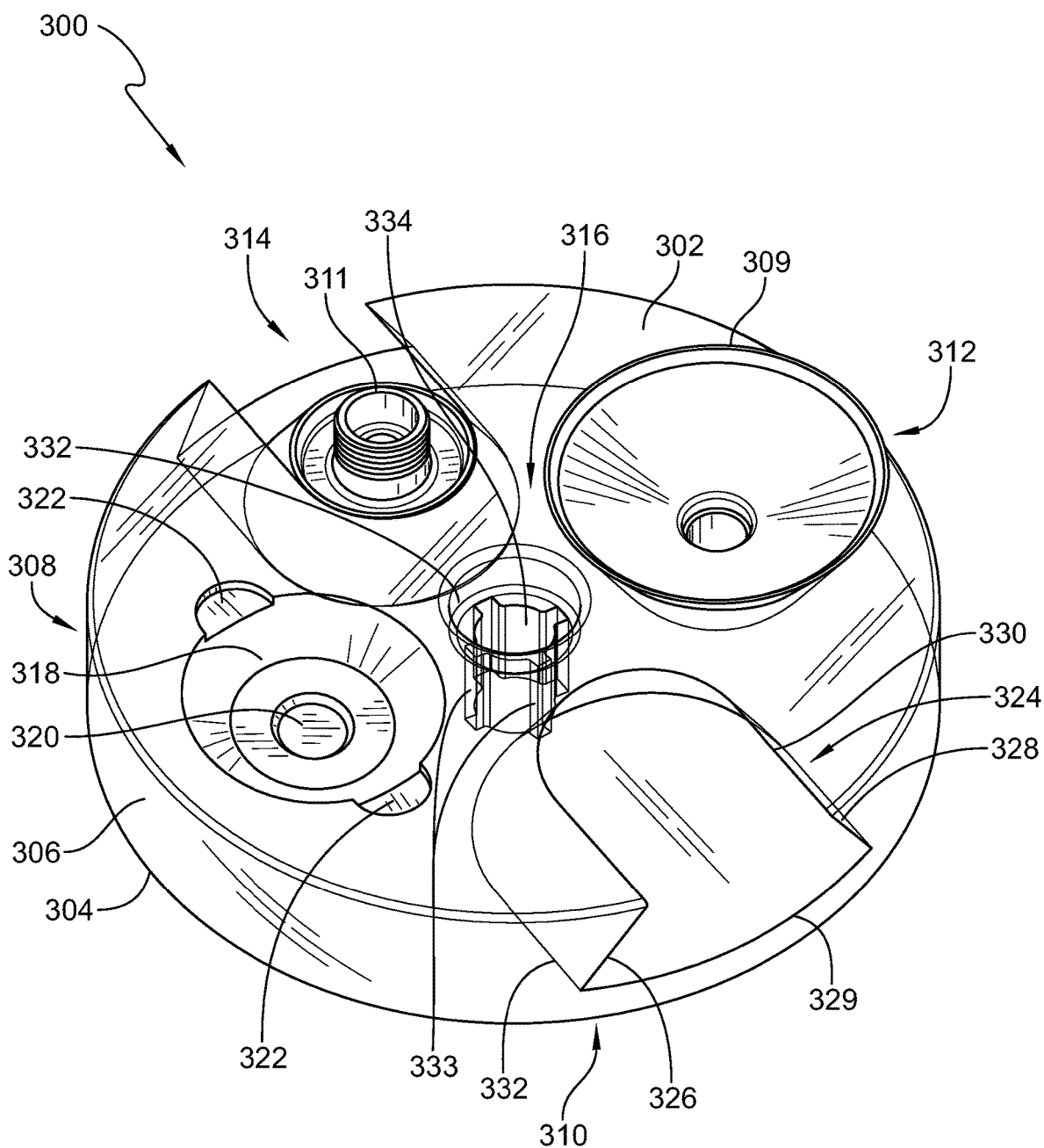
FIG. 3 is a perspective view of a base including ports for a plurality of bell cups of FIGS. 1A-1D.

As depicted in FIG. 3, base 300 may be disk-shaped and may include a circular flat top surface 302, flat bottom surface 304 and a sidewall extending therebetween defining a side surface 306. The base 300 may include at least one bell cup installation port 308 and at least one bell cup removal port 310, 109 formed in the top surface 302. As illustrated, the base may include a second bell cup installation port 312 and a second bell cup removal port 314 to accommodate more bell cups of various sizes. Although four ports are depicted, any number of ports may be formed in the base 300 to accommodate any size or number of bell cups. Alignment opening 316 is positioned centrally on the base 300 with each of the ports 308, 310, 312, 314 spaced radially and equidistantly from the alignment opening 316.

Bell cup installation port 308 may be formed as a blind hole, which may include a funnel-shaped linearly converging sidewall 318 extending a first depth into the base 300 and a cylindrical sidewall 320 extending from the first depth to a second, deeper depth in the base 300. The converging sidewall 318 may be sized to receive the exterior funnel-shaped wall of a bell cup and the cylindrical sidewall 320 may be sized to receive the cylindrical neck of a bell cup so that the bell cup is secured in the installation port 308 in a fixed manner relative to the base 300. Finger wells 322 may be provided as relatively shallow concave wells in the surface of the base 300 extending from opposite sides of the converging sidewall 318 to assist in removing the bell cup from the installation port 308. Port 312 depicts a bell cup fixed in an installation position so that rim 309 lies in a plane parallel to the upper surface 302 of the disk.

Bell cup removal port 310 is formed as a slot 324 opening at the sidewall surface 306 and extending inward from the sidewall surface 306. Slot 324 may have a U-shaped curved upper boundary 330 at the upper surface 302 of the base 300 that terminates at the sidewall surface 306. Angled sidewalls 326, 328 of the slot may extend in a diverging manner from the upper boundary 330 to a bottom boundary 332 defining a flat bottom wall 329. The angled sidewalls 326, 328 maybe angled and sized to accommodate the angled cup of the bell cup when the rim of the bell cup is contacting the flat bottom wall 328. As can be seen bottom boundary 332 may be a U-shaped and may have a greater width than the upper boundary 330 so that a bell cup may be loaded in a distributor removal position by sliding the cup along the rim into the port 310 from the sidewall 306 radially inward until the bell cup contacts the end of the U-shaped upper boundary 330 to secure the bell cup in a fixed distributor removal position as seen in port 314. Neck 311 of bell cup may extend above the surface 302 of the base 300 so that an upper most rim of the neck may be in a plane parallel to the upper surface 302 of the base.

Alignment opening 316 maybe a blind hole sized or keyed, to fit a distal end of an alignment arm as discussed in FIG. 2 above. Alignment opening may be cylindrical and include a first segment 332 extending from the upper surface 302 of the base having a diameter sized to receive a first larger portion of a distal segment so that detents of the first larger portion contact the sidewall in the first depth, and a second segment extending deeper from the first segment, the second segment 334 of a smaller cross section corresponding to a cross section of a second smaller portion of a distal segment. Second segment 334 of the cylinder of the alignment opening may be keyed to include radially spaced slots 333 corresponding to the detents on the alignment arm so that the manipulator may only be inserted into the alignment opening at particular orientations.

Figure 4:
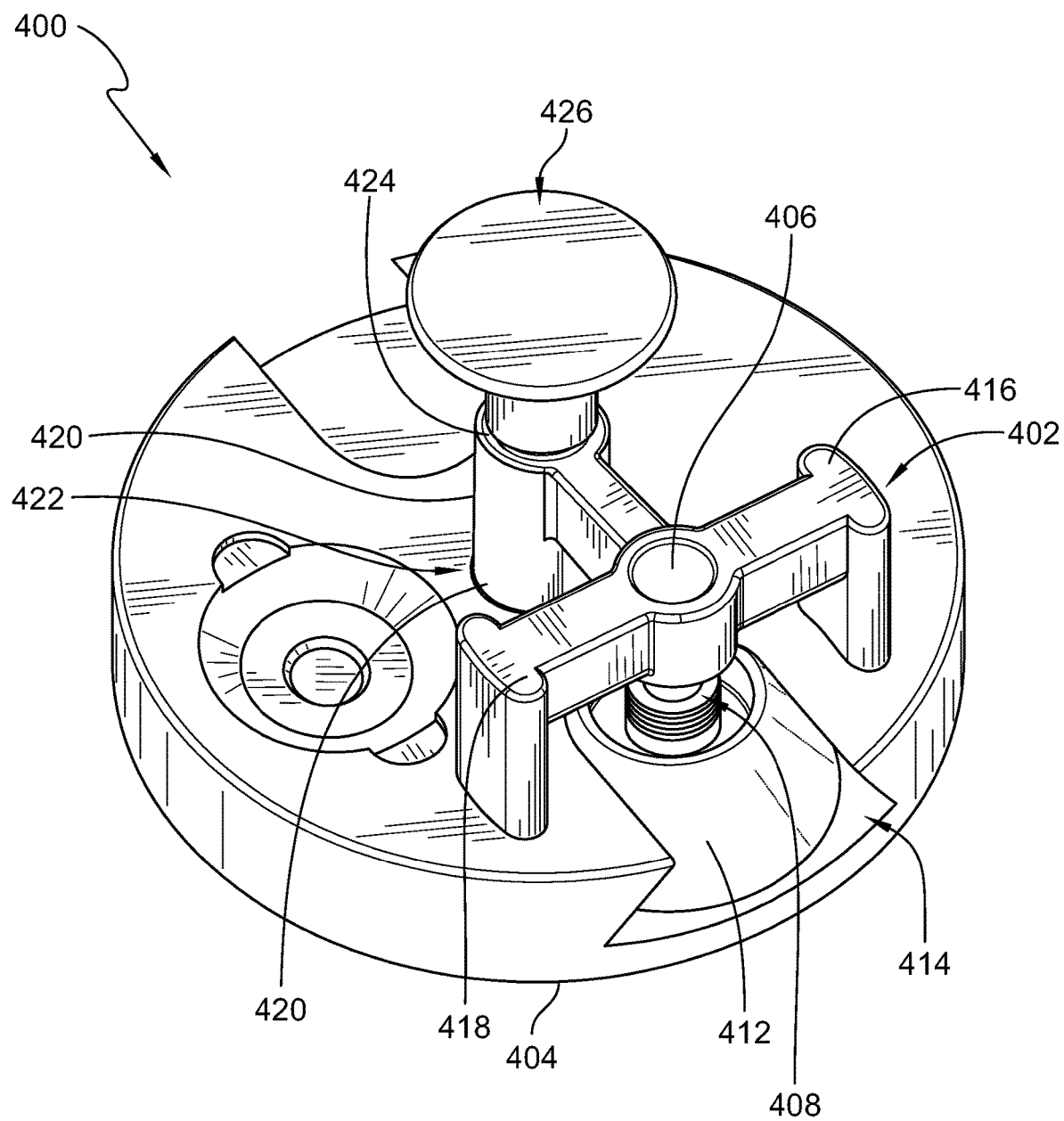
FIG. 4 is a perspective view of the bell cup multi-tool in alignment with a bell cup in the distributor removal position and the handpiece in the storage hub.
Figure 5:
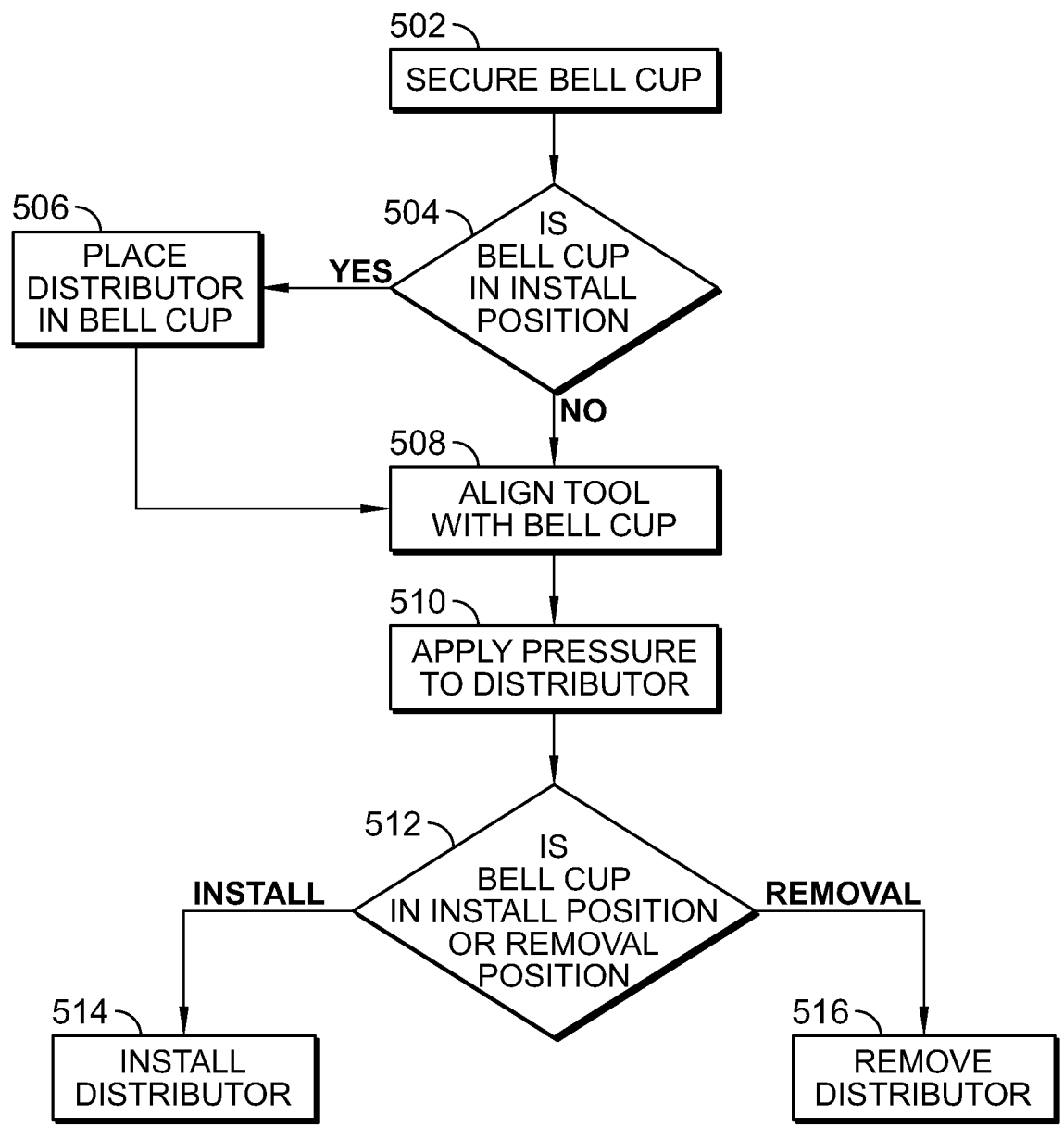
FIG. 5 is a flow diagram of a distributor installation and/or removal process according to the disclosed embodiment.

FIG. 4 illustrates the bell cup multi-tool 400 with the support member 402 coupled to the base 404 and the push-pin opening 406 aligned with an opening 408 in the neck of a bell cup 412 secured to the base in slot 414 face down in the distributor removal position. Support legs 416, 418 contact the base 404 on opposite sides of the bell cup 412. Alignment leg 420 is keyed in the central alignment opening 422. The push-pin 426 is depicted in a storage position and is secured in a storage opening 424 in alignment leg 420 via the pin.

A method of installing and/or removing a distributor from a bell cup may include securing the bell cup in a fixed position 502. As discussed above, the bell cup may be secured by coupling at the neck for distributor installation or at the cup for distributor removal. Securement may be performed via ports as described above, which may be machined into the portable base described above, or into a table or other component to form a base. If the bell cup is secured in an install position 504, then a distributor is placed in the concave side of the bell cup 506. A pressure-applying tool is then aligned with the central axis of the bell cup and distributor 508. A pressure is applied in a direction perpendicular to a contact surface of the bell cup 510. If the pressure is applied to the distributor when the bell cup is in an install position 512, then the distributor is pressed into the bell cup and installed in an interference or friction fit 514. If the pressure is applied to the distributor when the bell cup is in a removal position 512, then the tool extends through a neck of the bell cup and the contact pressure releases the distributor out of the bell cup and onto a surface beneath the bell cup 516.

Although the disclosed embodiments have been discussed using direct manual pressure, it is also contemplated that the pressure may be applied by an arbor press, a lever arm, or a drill press. Moreover, the above-described base may be secured to a work surface or table via magnets or a base-shaped indentation in the working surface to fit the base partially within the working surface.

Additionally, although components and openings have been disclosed to be cylindrical, any complementarily shaped component and opening may be used such as rectangular, or octagonal. A base may be sized to include any number of bell cup ports that are any number of sizes.

Vendor tools provided for distributor installation or removal lack support for the bell cup and are often small in size making them cumbersome to operate properly. Use of the tools improperly may result in damage to bell cups and render them inoperable. For example, the unsupported bell cup may move so that the pressure or pressure applied to a distributor is applied at an improper angle and may cause the distributor to be installed improperly and may cause damage to the distributor and/or bell cup itself.

The above described bell cup multi-tool provides for ergonomic straight-line pressure application during installation and removal of distributors from bell cups of one or more sizes by securing bell cups in predefined fixed positions in a base and providing a large easy to handle manipulator designed to be secured in predefined fixed positions in the base relative to the bell cups. The manipulator may be 3-D printed and may be made of plastic. The base may likewise be 3-D printed and may be made of plastic or may otherwise be made of metal or another heavier material than a plastic with a machined surface to create the ports.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A tool for removing a distributor from a bell cup and installing the distributor in the bell cup comprising:
   a manipulator having a push-pin and a support member,
   a base having receiving ports configured to secure the bell cup in an upwardly and downwardly facing position, and
   alignment means for providing straight line support between an end of the push-pin and a central axis of the bell cup by aligning the manipulator and the base so that the push-pin is aligned with the central axis of the bell cup so that contact pressure between a tip and the distributor is applied along an axis perpendicular to a contact surface of the distributor,
   wherein the alignment means comprises an alignment leg with an extension formed to include detents extending radially around the alignment leg and a blind bore hole in the base keyed to receive the detents.

2. The tool of claim 1, wherein the support member further comprises a pair of support legs extending in radially opposite directions from the push-pin and equally spaced from the alignment leg, each of the pair of support legs including an extension parallel to the push-pin and the alignment leg.

3. The tool of claim 2, wherein a length of the extension of the alignment leg is longer than a length of the extension of each support leg of the pair of support legs.

4. The tool of claim 1, wherein the support further comprises a push-pin receiver having an opening through which a portion of the push-pin extends.

5. The tool of claim 4, wherein the push-pin includes a handpiece and a pin having an install pressure transfer surface and a removal pressure transfer surface, the pin configured to be coupled to the handpiece so that one of the install pressure transfer surface or the removal pressure transfer surface extends away from the handpiece and through the opening of the push-pin receiver.

6. The tool of claim 1, wherein the base receiving port comprises a slot with an open end on an edge of the base and the slot is configured to receive a downwardly facing cone of the bell cup loaded from the open end on the edge and slid along the slot into a secured removal position.

7. The tool of claim 1, wherein the base receiving port comprises a blind hole configured to receive a neck of an upwardly facing bell cup in a secured install position.

8. A manipulator tool for removing and installing a distributor in a bell cup comprising:
   a push-pin having a handpiece and a pin coupled to the handpiece; and
   a support member including a plurality of legs extending radially from an opening configured to receive the push-pin therethrough and abut the handpiece,
   wherein one of the plurality of legs defines an alignment leg and has a length that is relatively longer than a length of all the other of the plurality of-legs and is configured to be inserted into a base, and
   wherein the other legs of the plurality of legs are equally spaced from the alignment leg.

9. The manipulator tool of claim 8, wherein the pin comprises two working surface ends, and a body extending therebetween, the body configured to couple with a receiver in the handpiece so that one of the two working surface ends extend away from the handpiece.

10. The manipulator tool of claim 9, wherein the two working surfaces comprise a removal surface of the distributor, an installation surface of the distributor, and the body is configured to be coupled to the receiver in an interference fit.

11. The manipulator tool of claim 8, wherein the plurality of legs each have an extension and the extensions are each parallel to each other, and wherein the extension of the alignment leg comprises a keyed distal end.

12. The manipulator tool of claim 11, wherein the keyed distal end comprises a plurality of detents extending radially from an exterior surface of the alignment leg.

13. The manipulator tool of claim 8, wherein the other of the plurality of legs are equal in length.

14. A base for securing one or more bell cups in a distributor installation and distributor removal position comprising:
   a disk having a bottom surface, a top surface, and a side surface;
   at least one blind bore hole extending into the disk from the top surface configured to secure a bell cup of the one or more bell cups in the distributor installation position so that a distal end of the bell cup is positioned parallel to the top surface of the disk; and
   at least one slot extending into the disk from the side surface configured to secure a second bell cup in the distributor removal position so that a rim of a neck of the bell cup is positioned parallel to the top surface of the disk,
   wherein the at least one blind bore hole extends a first distance into the disk to receive a neck of the bell cup, and a second distance into the disk radially exterior to the neck to form release wells.

15. The base of claim 14, wherein the at least one slot comprises a flat bottom wall and converging sidewalls that converge towards the neck of the second bell cup.

16. The base of claim 14, wherein the disk comprises a second blind bore hole and a second slot, the second blind bore hole and the second slot dimensioned to accommodate a larger bell cup than the at least one blind bore hole and at least one slot.

17. The base of claim 14, wherein the disk further comprises a receiver positioned centrally in the upper surface of the disk for receiving a portion of a leg of a manipulator tool to align the manipulator tool with the bell cup secured in the at least one blind bore hole and to align the manipulator tool with the second bell cup secured in the at least one slot.

18. The base of claim 14, wherein the disk further comprises a keyed receiver positioned centrally in the upper surface of the disk and the at least one blind bore hole and the at least one slot are positioned radially from the key receiver.

* * * * *